United States Patent
Hubbard et al.

(10) Patent No.: US 11,618,235 B2
(45) Date of Patent: Apr. 4, 2023

(54) ENCAPSULATED FRAGILE INSULATION MATERIALS

(71) Applicant: Holcim Technology Ltd, Zug (CH)

(72) Inventors: Michael J. Hubbard, Murfreesboro, TN (US); Chunhua Yao, Carmel, IN (US); John B. Letts, Carmel, IN (US)

(73) Assignee: Holcim Technology Ltd, Zug (CH)

( * ) Notice: Subject to any disclaimer, the term of this patent is extended or adjusted under 35 U.S.C. 154(b) by 0 days.

(21) Appl. No.: 17/281,448

(22) PCT Filed: Oct. 10, 2019

(86) PCT No.: PCT/US2019/055570
§ 371 (c)(1),
(2) Date: Mar. 30, 2021

(87) PCT Pub. No.: WO2020/077058
PCT Pub. Date: Apr. 16, 2020

(65) Prior Publication Data
US 2022/0001642 A1    Jan. 6, 2022

Related U.S. Application Data

(60) Provisional application No. 62/744,959, filed on Oct. 12, 2018.

(51) Int. Cl.
*B32B 3/04*    (2006.01)
*B32B 3/18*    (2006.01)
(Continued)

(52) U.S. Cl.
CPC .................. *B32B 3/04* (2013.01); *B32B 3/18* (2013.01); *B32B 5/022* (2013.01); *B32B 5/18* (2013.01); *B32B 5/245* (2013.01); *B32B 5/32* (2013.01); *B32B 27/065* (2013.01); *B32B 27/40* (2013.01); *B32B 2250/05* (2013.01); *B32B 2262/101* (2013.01); *B32B 2266/0278* (2013.01); *B32B 2266/08* (2013.01); *B32B 2307/304* (2013.01);
(Continued)

(58) Field of Classification Search
CPC .... B32B 3/04; B32B 3/18; B32B 5/18; B32B 5/245; B32B 5/32; B32B 27/065; B32B 27/40; B32B 2307/304; B32B 2307/3065; B32B 2419/06
See application file for complete search history.

(56) References Cited

U.S. PATENT DOCUMENTS

2003/0114549 A1* 6/2003 Kalinowski .......... C08G 18/482
                                                                    521/99
2015/0065592 A1* 3/2015 Girotti ................. C08G 18/092
                                                                    521/128
(Continued)

FOREIGN PATENT DOCUMENTS

WO    2017200905 A1    11/2017

OTHER PUBLICATIONS

International Search Report and Written Opinion for corresponding PCT/US2019/055570 dated Jan. 23, 2020 (12 pp).

*Primary Examiner* — Hai Vo
(74) *Attorney, Agent, or Firm* — Renner, Kenner; Arthur M. Reginelli

(57) ABSTRACT

A composite board comprising (i) a first foam region; (ii) at least one fragile insulating material; and (iii) a second foam region, where said second foam region is substantially devoid of hydrocarbons.

9 Claims, 7 Drawing Sheets

(51) Int. Cl.
    *B32B 5/02*          (2006.01)
    *B32B 5/18*          (2006.01)
    *B32B 5/24*          (2006.01)
    *B32B 5/32*          (2006.01)
    *B32B 27/06*        (2006.01)
    *B32B 27/40*        (2006.01)

(52) U.S. Cl.
    CPC ... *B32B 2307/3065* (2013.01); *B32B 2307/72* (2013.01); *B32B 2419/06* (2013.01)

(56) References Cited

U.S. PATENT DOCUMENTS

| | | |
|---|---|---|
| 2015/0078821 A1 | 3/2015 | Tackett et al. |
| 2015/0159023 A1* | 6/2015 | Lipka .................... D21H 19/00 |
| | | 252/606 |
| 2017/0015027 A1 | 1/2017 | Letts et al. |
| 2017/0210091 A1 | 7/2017 | McJunkins et al. |
| 2017/0335563 A1 | 11/2017 | Hubbard et al. |
| 2019/0100661 A1* | 4/2019 | Stogner .................... C09D 5/18 |
| 2019/0186124 A1 | 6/2019 | Hubbard et al. |

\* cited by examiner

ENCAPSULATED FRAGILE INSULATION MATERIALS

This application is a National-Stage application of PCT/US2019/055570 filed on Oct. 10, 2019, which claims the benefit of U.S. Provisional Application Ser. No. 62/744,959 filed on Oct. 12, 2018 which are incorporated herein by reference.

FIELD OF THE INVENTION

Embodiments of the present invention are directed toward insulation devices that include a plurality of fragile insulation materials encapsulated within a foam that is substantially devoid of hydrocarbon blowing agents and processes for producing said insulation devices.

BACKGROUND OF THE INVENTION

Fragile insulation materials are known in the art and include materials such as vacuum insulation panels (VIPs) and modified vacuum insulation panels such as modified atmosphere insulation (MAIs). While these materials provide advantageous insulating properties, they often have weak mechanical attributes. For example, fragile insulation materials, such as vacuum insulation panels, are often manufactured from very friable materials, such as fumed silica, aerogel, perlite, or glass. As a result, these materials are susceptible to mechanical damage during use. Additionally, vacuum insulation panels rely on gas-tight enclosures to ensure that a proper vacuum is formed, which provides the insulating capability to the material. Where this enclosure is compromised, such as through puncture, the insulating capabilities of the material are diminished or lost.

Attempts have been made at providing composites wherein fragile insulation materials (e.g. VIPs) are provided within a composite. For example, WO2006/134581 proposes an insulating panel wherein a VIP is embedded into an isocyanate based foam during manufacture of the panel. This manufacturing process includes the laying down of a first foam layer, followed by the positioning of a VIP onto the foam, and then the second laying down of foam over the VIP.

SUMMARY OF THE INVENTION

Figure 1:
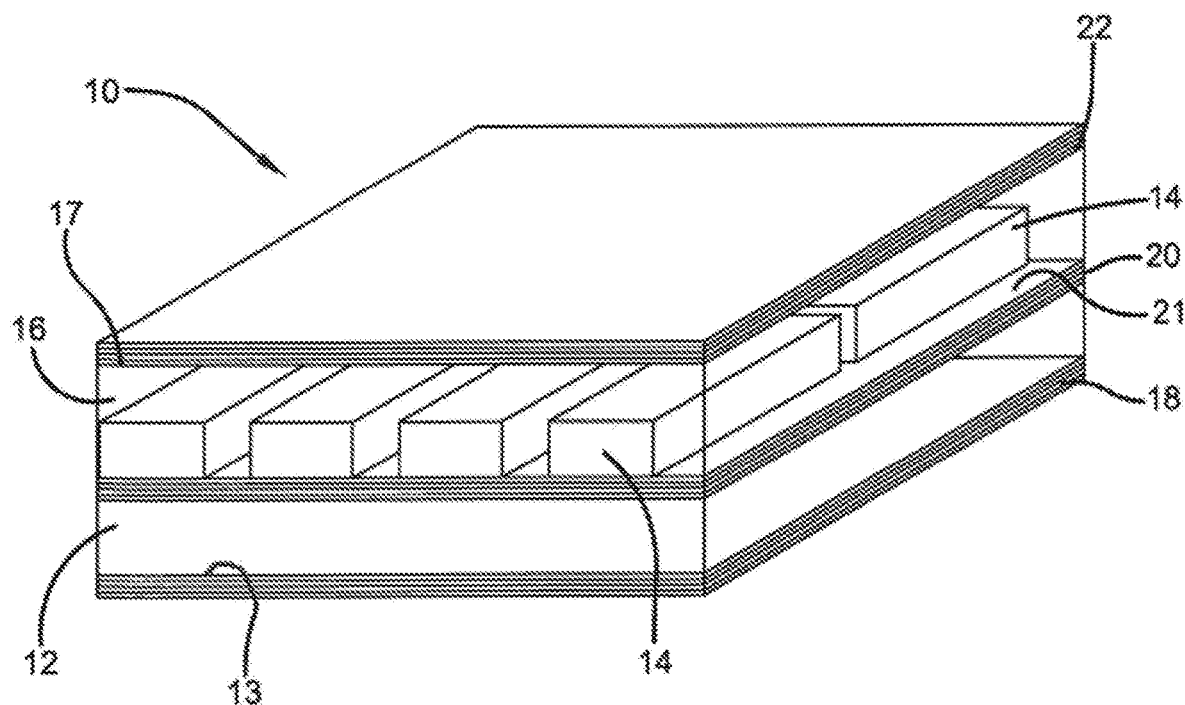
FIG. 1 is a cross-sectional, perspective view of a composite construction board according to aspects of the present invention.

One or more embodiments of the present invention provide a composite board comprising (i) a first foam region; (ii) at least one fragile insulating material; and (iii) a second foam region, where said second foam region is substantially devoid of hydrocarbons.

Other embodiments of the present invention provide a process for encapsulating fragile insulation materials, the process comprising (i) providing a preformed coverboard; (ii) positioning one or more fragile insulation materials on the coverboard; and (iii) depositing a developing foam over the fragile insulation materials to at least partially cover the fragile insulation materials and at least partially mate the developing foam with the coverboard, wherein the developing foam is substantially devoid of hydrocarbon blowing agents.

DETAILED DESCRIPTION OF ILLUSTRATIVE EMBODIMENTS

Embodiments of the present invention are based, at least in part, on the discovery of a construction board that includes a fragile insulation material that is at least partially encased within a foam structure that is substantially devoid of hydrocarbons (i.e. hydrocarbon blowing agents). In one or more embodiments, the foam that at least partially encases the fragile insulation material is produced in the presence of water, which reacts and gives rise to carbon dioxide during the foaming process. Since the foam is substantially devoid of hydrocarbon, the construction boards of the present invention exhibit improved fire resistance. In particular embodiments, the fragile insulation material is completely encased by foam having cells that are substantially devoid of hydrocarbons.

Configuration of Construction Board

Construction boards according to embodiments of the present invention can be described with reference to FIG. 1, which shows construction board 10, which may also be referred to as composite 10 or simply board 10. As shown, board 10, which is generally planar in configuration, includes a first foam region 12, a fragile insulation material 14, and a second foam region 16. In one or more embodiments, the first foam region 12 is substantially devoid of hydrocarbon. In other embodiments, the second foam region 16 is substantially devoid of hydrocarbon. In yet other embodiments, both first foam region 12 and second foam region 16 are substantially devoid of hydrocarbon. In certain embodiments, one foam region is devoid of a physical blowing agent (e.g. hydrocarbon or halocarbon) while the other region includes a physical blowing agent.

As also shown in FIG. 1, construction board 10 may include a plurality of fragile insulation materials 14 with second foam region 16 disposed between the respective fragile insulation materials. Also, in one or more embodiments, first foam region 12 forms a continuous foam layer upon which the plurality of fragile insulation materials 14 are disposed. Still further, at least a portion of second foam region 16 forms a continuous layer above the plurality of fragile insulation materials 14 relative to first foam region 12 (i.e., opposite first foam region 12 relative to fragile insulation materials 14). Also, second foam layer region 16 forms a region or barrier around the periphery of board 10 such that fragile insulation materials 14 are encased around the four sides of construction board 10.

In one or more embodiments, construction board 10 may include one or more of an optional first facer 18, an optional second facer 20, and an optional third facer 22. As shown in FIG. 1, first facer 18 is disposed on a first planar surface 13 of first foam region 12 and forms an outermost surface of construction board 10. Similarly, third facer 22 is disposed on a planar surface 17 of second foam region 16 and thereby forms an outermost planar surface of construction board 10 opposite first facer 18. Second facer 20 is disposed between first foam region 12 and second foam region 16. In one or more embodiments, fragile insulation materials 14 are directly in contact with a planar surface 21 of second facer 20.

Fragile Insulation Materials

Practice of the present invention is not necessarily limited by the selection of the fragile insulation material. In one or more embodiments, the fragile insulation materials offer greater insulating properties than the closed-cell foams that encase the fragile insulation materials. In one or more embodiments, the fragile insulation materials have a lower thermal conductivity than closed-cell foams that encase the fragile insulation materials. In one or more embodiments, the fragile insulation materials include a friable component.

In one or more embodiments, the fragile insulation materials are or include cellular or open cell structures wherein the cellular walls of the cellular structure include one or more of silica (e.g. fumed or precipitated silica), alumina, titania, magnesia, chromia, tin dioxide, glass wool, fiberglass, polymeric materials, and carbon. In one or more embodiments, the cellular structure may include aluminosilicates such as, but not limited to, perlite.

In one or more embodiments, the fragile insulation material may include an aerogel. Specific examples include carbon aerogels, silica aerogels, and alumina aerogels.

In one or more embodiments, the fragile insulation material includes a vacuum insulation panel (VIP). Vacuum insulation panels are known and generally include substantially gas-tight enclosures surrounding a rigid core wherein air therein has been evacuated. The enclosures may include membrane walls that prevent air from entering the panel. The core may include a rigid, highly-porous material that supports the membrane walls against atmospheric pressure once the air is evacuated.

Examples of vacuum insulation panels include those that include a cellular core that may include silica (e.g. fumed or precipitated silica), alumina, titania, magnesia, chromia, tin dioxide, glass wool, fiberglass, carbon, aluminosilicates (e.g. perlite), and open-cell polymeric materials, including polymeric fibers, such as open-cell polystyrene or open-cell polyurethane. In these or other embodiments, the core may include an aerogel such as carbon aerogels, silica aerogels, and alumina aerogels.

Some specific examples of vacuum insulation panels are also described in U.S. Pat. Publ. Nos. 2013/0216854; 2013/0216791; 2013/0142972; 2013/0139948; 2012/0009376; 2009/0126600; 2008/0236052; 2004/0058119; 2003/0159404; and 2003/0082357 which are incorporated herein by reference.

In other embodiments, the fragile insulation materials include modified atmospheric insulation (MAI) panels. MAIs are produced with steam, in lieu of a porous silica core as typically found in a VIP, which, as it cools and condenses, leaves a vacuum. The manufacturing process may advantageously be devoid of sealing the device under very low pressure. Devices of this nature, and methods for their manufacture, are disclosed in U.S. Publication Nos. 2014/0360044 and 2014/0366480, which are incorporated herein by reference.

Characteristics of First Foam Region

In one or more embodiments, the first foam layer includes a polyurethane and/or polyisocyanurate foam. In one or more embodiments, the foam is a cellular structure that may include an interconnected network of solid struts or plates that form the edges and faces of cells. These cellular structures may, in one or more embodiments, also be defined by a "relative density" that is less than 0.8, in other embodiments less than 0.5, and in other embodiments less than 0.3. As those skilled in the art will appreciate, "relative density" refers to the density of the cellular material divided by that of the solid from which the cell walls are made. As the relative density increases, the cell walls thicken and the pore space shrinks such that at some point there is a transition from a cellular structure to one that is better defied as a solid containing isolated pores.

In one or more embodiments, the first foam region has a density defined according to ASTMC 303 that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In these or other embodiments, the first foam region may have a density that is greater than 1.30 pounds per cubic foot, in other embodiments greater than 1.50 pounds per cubic foot (7.32 kg/m$^2$), and in other embodiments greater than 1.55 pounds per cubic foot (7.57 kg/m$^2$). In one or more embodiments, the first foam region has a density of from about 1.3 to about 2.5, in other embodiments from about 1.50 to about 2.0, and in other embodiments from about 1.55 to about 1.8 pounds per cubic foot. In one or more embodiments, the first foam region includes a closed-cell foam.

In one or more embodiments, the first foam region has a density defined according to ASTMC 303 that is less than 20 pounds per cubic foot, in other embodiments less than 10 pounds per cubic foot, in other embodiments less than 5.8 pounds per cubic foot, and still in other embodiments less than 5.5 pounds per cubic foot. In these or other embodiments, the first foam region may have a density that is greater than 2.5 pounds per cubic foot, in other embodiments greater than 2.8 pounds per cubic foot, in other embodiments greater than 3.0 pounds per cubic foot, and in other embodiments greater than 3.5 pounds per cubic foot. In one or more embodiments, the first foam region has a density of from about 2.5 to about 20, in other embodiments from about 2.8 to about 10, in other embodiments from about 3.0 to about 5.8 pounds per cubic foot, and in other embodiments from about 3.5 to about 5.5 pounds per cubic foot.

As indicated above, the first foam region is substantially devoid of hydrocarbon, which refers to that amount or less that does not have an appreciable impact on the properties of the foam, particularly the fire resistance of the foam. In one or more embodiments, the first foam layer includes less than 1000, in other embodiments less than 500, in other embodiments less than 250, in other embodiments less than 100, and in other embodiments less than 10 ppm hydrocarbon based upon the weight of the foam. In one or more embodiments, the first foam layer is devoid of hydrocarbons. As those skilled in the art understand, reference to the amount of hydrocarbon within the foam or a layer of the composites of the present invention refers to hydrocarbon contained within the cells of the foam structure, which is typically present in conventional foams due to the use of a physical blowing agent during manufacture of the foam. The term hydrocarbon, as used herein, is consistent with its ordinary meaning as understood by those skilled in the art and includes those compounds that exclusively include carbon and hydrogen. In particular embodiments, the hydrocarbons that are specifically excluded are low-molecular weight hydrocarbons that are used as blowing agents such as butane, pentane, and hexane isomers.

In one or more embodiments, the first foam region (e.g. foam layer 12) is devoid or substantially devoid of physical blowing agents. In one or more embodiments, the first foam layer includes less than 1000, in other embodiments less than 500, in other embodiments less than 250, in other embodiments less than 100, and in other embodiments less than 10 ppm of a physical blowing agent based upon the entire weight of the foam.

In one or more embodiments, the first foam region is substantially devoid of halocarbons, which refers to that amount or less that does not have an appreciable impact on the properties of the foam. In one or more embodiments, the first foam region includes less than 1000, in other embodiments less than 500, in other embodiments less than 250, in other embodiments less than 100, and in other embodiments less than 10 ppm halocarbon based upon the weight of the foam. In one or more embodiments, the first foam layer is devoid of halocarbons. The term halocarbon, as used herein, is consistent with the ordinary meaning as understood by those skilled in the art and includes those hydrocarbons wherein at least one hydrogen is replaced by a halogen atom.

In one or more embodiments, the first foam region is a polyurethane and/or polyisocyanurate foam characterized by an index, which is calculated from the concentration of the isocyanate-containing compound or moieties to the isocyanate-reactive compounds or moieties within the respective A-side and B-side streams that are used to prepare the foam as is discussed in greater detail below. In one or more embodiments, the foam of the first foam region has an ISO index of greater than 150, in other embodiments greater than 170, in other embodiments greater than 190, in other embodiments greater than 210, in other embodiments greater than 220, in other embodiments greater than 225, in other embodiments greater than 230, in other embodiments greater than 235, in other embodiments greater than 240, in other embodiments greater than 245, and in other embodiments greater than 250. In these or other embodiments, the foam of the first foam region has an ISO index of less than 400, in other embodiments of less than, and in other embodiments of less than 300. In one or more embodiments, the foam of the first foam region has an ISO index of from about 150 to about 400, in other embodiments from about 170 to about 350, and in other embodiments from about 190 to about 330, and in other embodiments from about 220 to about 280.

In certain embodiments, the first foam region includes a hydrocarbon or halocarbon blowing agent (i.e. a physical blowing agent). As the skilled person appreciates, the hydrocarbon or halocarbon blowing agents may include, but are not limited to, isopentane, n-pentane, cyclopentane, alkanes, (cyclo)alkanes, hydrofluorocarbons, hydrochlorofluorocarbons, fluorocarbons, fluorinated ethers, alkenes, alkynes, hydrofluoroolefins (HFOs) and noble gases. In one or more embodiments, the first foam region include at least 1000, in other embodiments at least 5,000, in other embodiments at least 7,500, and in other embodiments at least 10,000 ppm hydrocarbon or halocarbon based upon the weight of the foam.

Characteristics of Second Foam Region

In one or more embodiments, the second foam layer includes a polyurethane and/or polyisocyanurate foam. In one or more embodiments, the foam is a cellular structure that may include an interconnected network of solid struts or plates that form the edges and faces of cells. These cellular structures may, in one or more embodiments, also be defined by a "relative density" that is less than 0.8, in other embodiments less than 0.5, and in other embodiments less than 0.3.

As those skilled in the art will appreciate, "relative density" refers to the density of the cellular material divided by that of the solid from which the cell walls are made. As the relative density increases, the cell walls thicken and the pore space shrinks such that at some point there is a transition from a cellular structure to one that is better defied as a solid containing isolated pores.

In one or more embodiments, the second foam region has a density defined according to ASTMC 303 that is less than 2.5 pounds per cubic foot ($12 \text{ kg/m}^2$), in other embodiments less than 2.0 pounds per cubic foot ($9.8 \text{ kg/m}^2$), in other embodiments less than 1.9 pounds per cubic foot ($9.3 \text{ kg/m}^2$), and still in other embodiments less than 1.8 pounds per cubic foot ($8.8 \text{ kg/m}^2$). In these or other embodiments, the second foam region may have a density that is greater than 1.30 pounds per cubic foot, in other embodiments greater than 1.50 pounds per cubic foot ($7.32 \text{ kg/m}^2$), and in other embodiments greater than 1.55 pounds per cubic foot ($7.57 \text{ kg/m}^2$). In one or more embodiments, the second foam region has a density of from about 1.3 to about 2.5, in other embodiments from about 1.50 to about 2.0, and in other embodiments from about 1.55 to about 1.8 pounds per cubic foot. In one or more embodiments, the second foam region includes a closed-cell foam.

In one or more embodiments, the second foam region has a density defined according to ASTMC 303 that is less than 20 pounds per cubic foot, in other embodiments less than 10 pounds per cubic foot, in other embodiments less than 5.8 pounds per cubic foot, and still in other embodiments less than 5.5 pounds per cubic foot. In these or other embodiments, the second foam region may have a density that is greater than 2.5 pounds per cubic foot, in other embodiments greater than 2.8 pounds per cubic foot, in other embodiments greater than 3.0 pounds per cubic foot, and in other embodiments greater than 3.5 pounds per cubic foot. In one or more embodiments, the second foam region has a density of from about 2.5 to about 20, in other embodiments from about 2.8 to about 10, in other embodiments from about 3.0 to about 5.8 pounds per cubic foot, and in other embodiments from about 3.5 to about 5.5 pounds per cubic foot.

As indicated above, the second foam region is substantially devoid of hydrocarbon, which refers to that amount or less that does not have an appreciable impact on the properties of the foam, particularly the fire resistance of the foam. In one or more embodiments, the second foam layer includes less than 1000, in other embodiments less than 500, in other embodiments less than 250, in other embodiments less than 100, and in other embodiments less than 10 ppm hydrocarbon based upon the weight of the foam. In one or more embodiments, the second foam layer is devoid of hydrocarbons. The terms hydrocarbon and physical blowing agent have the same meaning as used relative to the first foam region.

In one or more embodiments, the second foam layer (e.g. foam layer 14) is devoid or substantially devoid of physical blowing agents. In one or more embodiments, the second foam layer includes less than 1000, in other embodiments less than 500, in other embodiments less than 250, in other embodiments less than 100, and in other embodiments less than 10 ppm of a physical blowing agent based upon the entire weight of the foam.

In one or more embodiments, the second foam region is substantially devoid of halocarbons, which refers to that amount or less that does not have an appreciable impact on the properties of the foam. In one or more embodiments, the second foam region includes less than 1000, in other embodiments less than 500, in other embodiments less than 250, in other embodiments less than 100, and in other embodiments less than 10 ppm halocarbon based upon the weight of the foam. In one or more embodiments, the second foam layer are devoid of halocarbons. The term halocarbon, as used herein, is consistent with the ordinary meaning as understood by those skilled in the art and includes those hydrocarbons wherein at least one hydrogen is replaced by a halogen atom.

In one or more embodiments, the second foam region is a polyurethane and/or polyisocyanurate foam characterized by an index, which is calculated from the concentration of the isocyanate-containing compound or moieties to the isocyanate-reactive compounds or moieties within the respective A-side and B-side streams that are used to prepare the foam as is discussed in greater detail below. In one or more embodiments, the foam of the second foam region has an ISO index of greater than 150, in other embodiments greater than 170, in other embodiments greater than 190, in other embodiments greater than 210, in other embodiments greater than 220, in other embodiments greater than 225, in other embodiments greater than 230, in other embodiments greater than 235, in other embodiments greater than 240, in other embodiments greater than 245, and in other embodiments greater than 250. In these or other embodiments, the foam of the second foam region has an ISO index of less than 400, in other embodiments of less than, and in other embodiments of less than 300. In one or more embodiments, the foam of the second foam region has an ISO index of from about 150 to about 400, in other embodiments from about 170 to about 350, and in other embodiments from about 190 to about 330, and in other embodiments from about 220 to about 280.

Facers

In one or more embodiments, the facers (e.g. facers 18, 20, and/or 22) may include those facers that are conventionally employed in the art of making foam construction boards. For example, useful facers include fabric facers such as non-woven cellulosic fabrics, non-woven synthetic fabrics, and non-woven glass fabrics. In one or more embodiments, these non-woven fabrics may include oriented reinforcing fibers. For example, non-woven cellulosic fabrics may be reinforced with glass strands. In one or more embodiments, the fabrics may include one or more binders that serve to hold the non-woven fabrics in place. For example, it is common to employ formaldehyde-based binders to secure non-woven glass fabrics. In these or other embodiments, the fabrics may be coated. In other words, a coating, which typically includes filler and polymeric binder, can be applied to one or both planar surfaces of the fabric.

Figure 2:
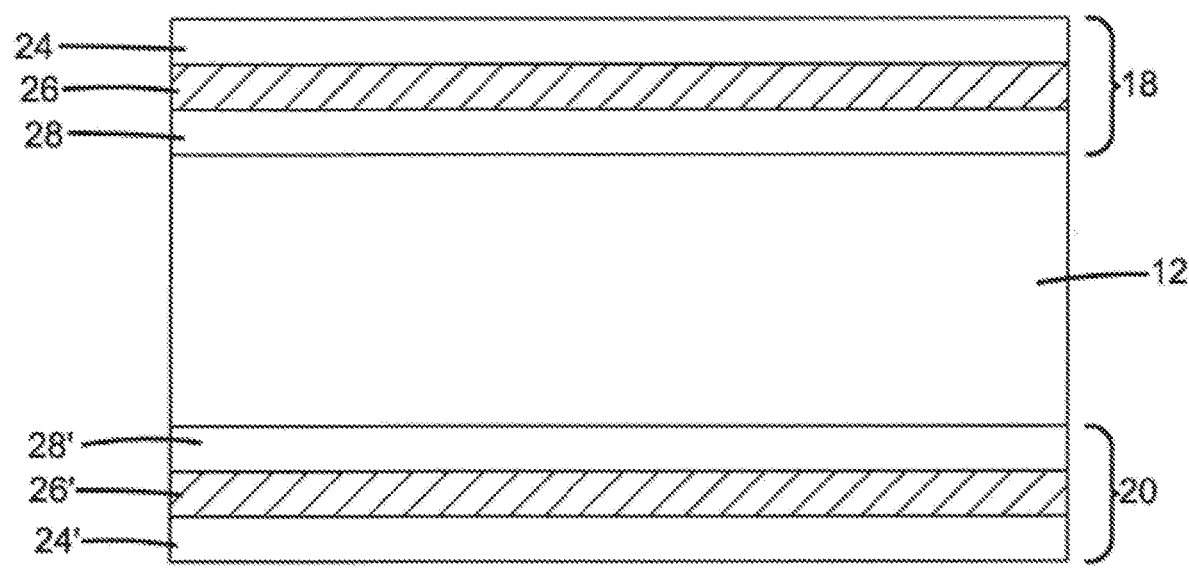
FIG. 2 is a cross-sectional view of a composite construction board according to aspects of the present invention.

In one or more embodiments, at least one of facers 18, 20, and 22 include a double-coated facer. That is, a coating layer is disposed on both planar surfaces of the fabric. For example, as shown in FIG. 2, facer 18, which is disposed on first foam region 12 as depicted in FIG. 1, includes external coating 24, which may also be referred to as external coating layer 24 or simply layer 24. External coating 24 is disposed on a fabric substrate 26, which may simply be referred to as fabric 26. An interfacial coating 28, which may also be referred to as an interfacial coating layer 28, or simply layer 28, is disposed between fabric 26 and foam region 12.

In one or more embodiments, facer 20, which is also disposed on first foam region 12, opposite facer 18, as depicted in FIG. 2, includes external coating 24', fabric substrate 26', and interfacial coating 28'.

In one or more embodiments, at least one of facers 18, 20, and 22 are single-coated facers; in other words, interfacial coating layer 28 and/or 28' is not present.

Glass Substrate

In one or more embodiments, the glass substrates (e.g. 26, 26') are inorganic substrates. In particular embodiments, the substrate is a non-woven glass mat. In one or more embodiments, the non-woven fiberglass mats include glass fibers and a binder that binds the glass fibers together and maintains the fibers in a mat form. Any type of glass fiber mat can be used in the composite board. For example, a non-woven glass fiber mat can be made with glass fibers, the fibers can be bonded with an aqueous thermosetting resin such as, for example, urea formaldehyde or phenolic resole resins. As the skilled person will appreciate, these binder resins are conventional in the art of non-woven glass mats.

In one or more embodiments, the dimensional and weight characteristics of the glass substrates are not particularly limited, and can depend on the specific application and desired properties of the construction board. For example, the basis weight of the glass substrates can be from about 50 grams per square meter to about 150 grams per square meter. The thickness of the glass substrates can be, for example, from about 0.015 inch to about 0.05 inch (about 0.038 to about 0.13 cm). The basis weight and thickness characteristics can be adjusted depending upon the desired rigidity, strength and weight of the construction board.

In one or more embodiments, the thickness of the glass substrates absent the coating layer described herein may be from about 0.01 to about 1.00 inch (about 0.03 to about 2.54 cm) or in other embodiments from about 0.015 to about 0.05 inches thick (about 0.038 to about 0.13 cm).

External Coating

In one or more embodiments, the external coatings (24, 24') include an inert filler dispersed within a binder or matrix. In one or more embodiments, the external coating includes an inorganic filler dispersed throughout a binder. In one or more embodiments, the external coating is devoid or substantially devoid of intumescent material.

In one or more embodiments, the external coatings may have a thickness of at least 0.005 mm, in other embodiments at least 0.01 mm, in other embodiments 0.05 mm, and in other embodiments at least 0.09 mm. In these or other embodiments, the external coatings may have a thickness of less than 1.5 mm, in other embodiments less than 1.0 mm, in other embodiments less than 0.7 mm, in other embodiments less than 0.3 mm, and in other embodiments less than 0.1 mm.

In one or more embodiments, the concentration of filler within the external coatings may be expressed as the weight of filler relative to the entire weight of the layer. In one or more embodiments, the amount of filler within the external coatings may be more than 0.5 wt %, in other embodiments more than 1.0 wt %, and in other embodiments more than 3.0 wt %. In these or more embodiments, the amount of filler within the external coatings may be less than 50 wt %, in other embodiments less than 40 wt %, and in other embodiments less than 30 wt %. In one or more embodiments, the amount of filler within the external coatings may be from about 0.5 to about 50 wt %, in other embodiments from about 1.0 to about 40 wt %, and in other embodiments from about 3.0 to about 30 wt %.

In one or more embodiments, the thickness of the external coatings may be greater than 0.5 mm, in other embodiments greater than 1 mm, and in other embodiments greater than 1.5 mm. In these or more embodiments, the thickness of the external coatings may be less than 7 mm, in other embodiments less than 5 mm, and in other embodiments less than 3 mm. In one or more embodiments, the thickness of the external coatings may be from about 0.5 to about 7 mm, in other embodiments from about 1 to about 5 mm, and in other embodiments from about 1.5 to about 3 mm.

In one or more embodiments, the binder used in the external layers may include natural or synthetic materials. For example, natural materials may include natural rubber, waxes and starches. Synthetic materials may include polyolefins, styrene-butadiene copolymers, polyvinyl chlorides, acrylic polymers, and methacrylic polymers, silicones, and copolymers thereof including functional copolymers thereof. For example, the binders may include styrene-butadiene polymers bearing one or more hydrophobic moieties (e.g. fluorine-containing groups) for repelling water. Still other examples include, but not limited to, polyurethane coating compositions, polymeric resin coating compositions, and siloxane coating compositions, as well as polymer-modified asphalt or bitumen coating compositions. These polymers may derive from latex compositions that carry one or more of the polymers.

In one or more embodiments, the external coating layers can include from about 1 wt % to about 15 wt %, or in other embodiments from about 2 to about 10 wt %, binder based on the weight of the respective layers.

Examples of a suitable inert filler include calcium carbonate, clay, talc, mica, perlite, hollow ceramic spheres or a combination thereof. In an exemplary embodiment, the inert filler is calcium carbonate.

In one or more embodiments, the external coating layers can include from about 80 wt % to about 98 wt %, or in other embodiments from 85 to about 95 wt % inert filler based on the weight of each respective layer.

Interfacial Layer

In one or more embodiments, the interfacial coatings (e.g. layers 28 or 28') include an intumescent material dispersed within a binder. In particular embodiments, the intumescent material is expandable graphite. In one or more embodiments, the interfacial layers may include a complementary filler such as inert filler or inorganic filler. In other embodiments, the interfacial layers are devoid or substantially devoid of filler other than intumescent material.

In one or more embodiments, the thickness of the interfacial layers may be greater than 1 μm, in other embodiments greater than 20 μm, and in other embodiments greater than 50 μm. In these or other embodiments, the thickness of the interfacial layers may be less than 5 mm, in other embodiments less than 1 mm, and in other embodiments less than 0.5 mm. In one or more embodiments, the thickness of the interfacial layers may be from about 1 μm to about 5 mm, in other embodiments from about 20 μm to about 1 mm, and in other embodiments from about 50 μm to about 0.5 mm.

In one or more embodiments, the concentration of intumescent material (e.g. expandable graphite) within the interfacial layers may be expressed as the weight of intumescent material relative to the entire weight of the layer. In one or more embodiments, the amount of intumescent material within the interfacial layers may be more than 0.5 wt %, in other embodiments more than 1.0 wt %, and in other embodiments more than 3.0 wt %. In these or more embodiments, the amount of intumescent material within the interfacial layers may be less than 50 wt %, in other embodiments less than 40 wt. %, and in other embodiments less than 30 wt %. In one or more embodiments, the amount of intumescent material within the interfacial layers may be from about 0.5 to about 50 wt %, in other embodiments from about 1.0 to about 40 wt %, and in other embodiments from about 3.0 to about 30 wt %.

In one or more embodiments, the binder used in the interfacial layers may include natural or synthetic materials. For example, natural materials may include natural rubber, waxes and starches. Synthetic materials may include polyolefins, styrene-butadiene copolymers, polyvinyl chlorides, acrylic polymers, and methacrylic polymers, silicones, and copolymers thereof including functional copolymers thereof. For example, the binders may include styrene-butadiene polymers bearing one or more hydrophobic moieties (e.g. fluorine-containing groups) for repelling water. Still other examples include, but not limited to, polyurethane coating compositions, polymeric resin coating compositions, and siloxane coating compositions, as well as polymer-modified asphalt or bitumen coating compositions.

In one or more embodiments, complementary fillers include, but are not limited to, In one or more embodiments, the fire-resistant materials may include inorganic mineral fillers such as clays, silicates, titanium dioxide, talc (magnesium silicate), mica (mixtures of sodium and potassium aluminum silicate), alumina trihydrate, antimony trioxide, calcium carbonate, titanium dioxide, silica, magnesium hydroxide, calcium borate ore, colemanite, and mixtures thereof.

Intumescent Materials

In one or more embodiments, intumescent materials include expandable graphite, which may also be referred to as expandable flake graphite, intumescent flake graphite, or expandable flake, includes intercalated graphite in which an intercalant material is included between the graphite layers of graphite crystal or particle. Examples of intercalant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercalant materials. In certain embodiments, the expandable graphite includes sulfate intercalants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 75% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite may be characterized as having a pH in the range from about 1 to about 12; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

Specific Embodiments

In particular embodiments, the composites of the present invention include a high-density polyisocyanurate board, which as described above is a board having a density of greater than 2.5 pounds per cubic foot. In these or other embodiments, this high density board carries a coated glass facer. For example, the coated glass facer may include a double-coated glass facer as described above. In combination therewith, the foam deposited on and surrounding the fragile insulation materials is engineered to have a relatively low density (e.g. a density of less than 2.5 pounds per cubic foot as described above). Thus, and with reference to FIG. 1, the composite 10 of one or more embodiments includes a first foam layer 12 that is a high density foam (e.g. greater than 2.5 pounds per cubic foot), fragile insulation materials 14 disposed on (and optionally adhered or otherwise attached to the high density foam layer 12 or facer 20), and a low density (e.g. less than 2.5 pounds per cubic foot) foam 16 disposed on and mated to portions of foam layer 12 (or facer 20) and at least partially surrounding fragile insulation materials 14.

Methods of Manufacture

In one or more embodiments, the construction boards of the present invention may be produced by first providing a foam board (e.g. high density polyisocyanurate board with optional facers such as glass mat facers), positioning one or more fragile insulation materials on the foam board, and depositing a developing foam over the fragile insulation materials to at least partially cover the fragile insulation materials and at least partially mate the developing foam to the foam board.

Figure 3:
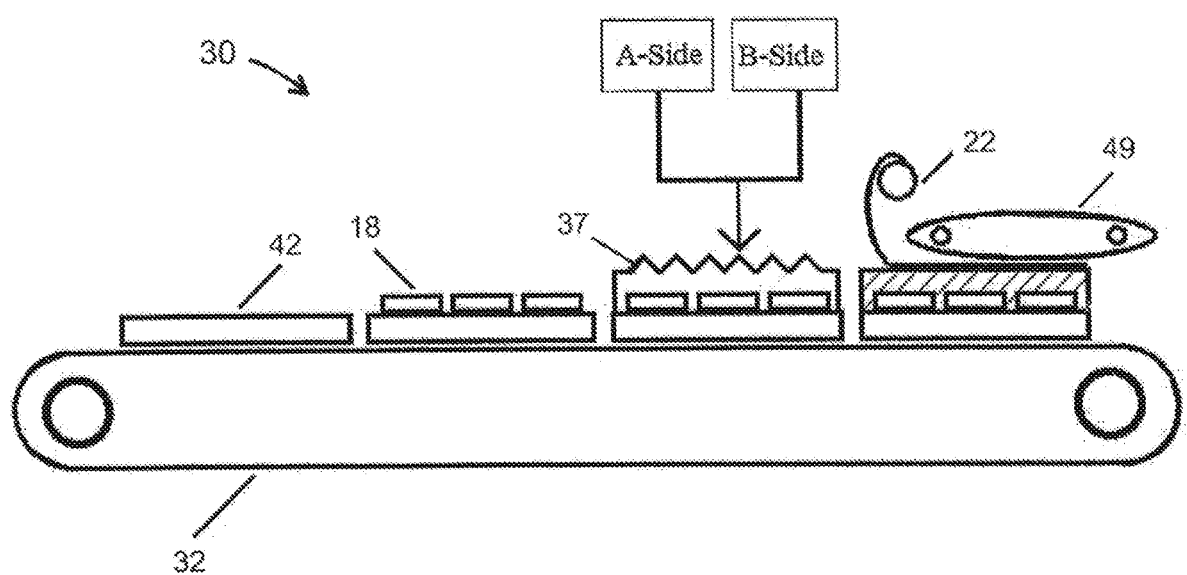
FIG. 3 is a schematical representation of a process according to embodiments of the present invention.
Figure 4:
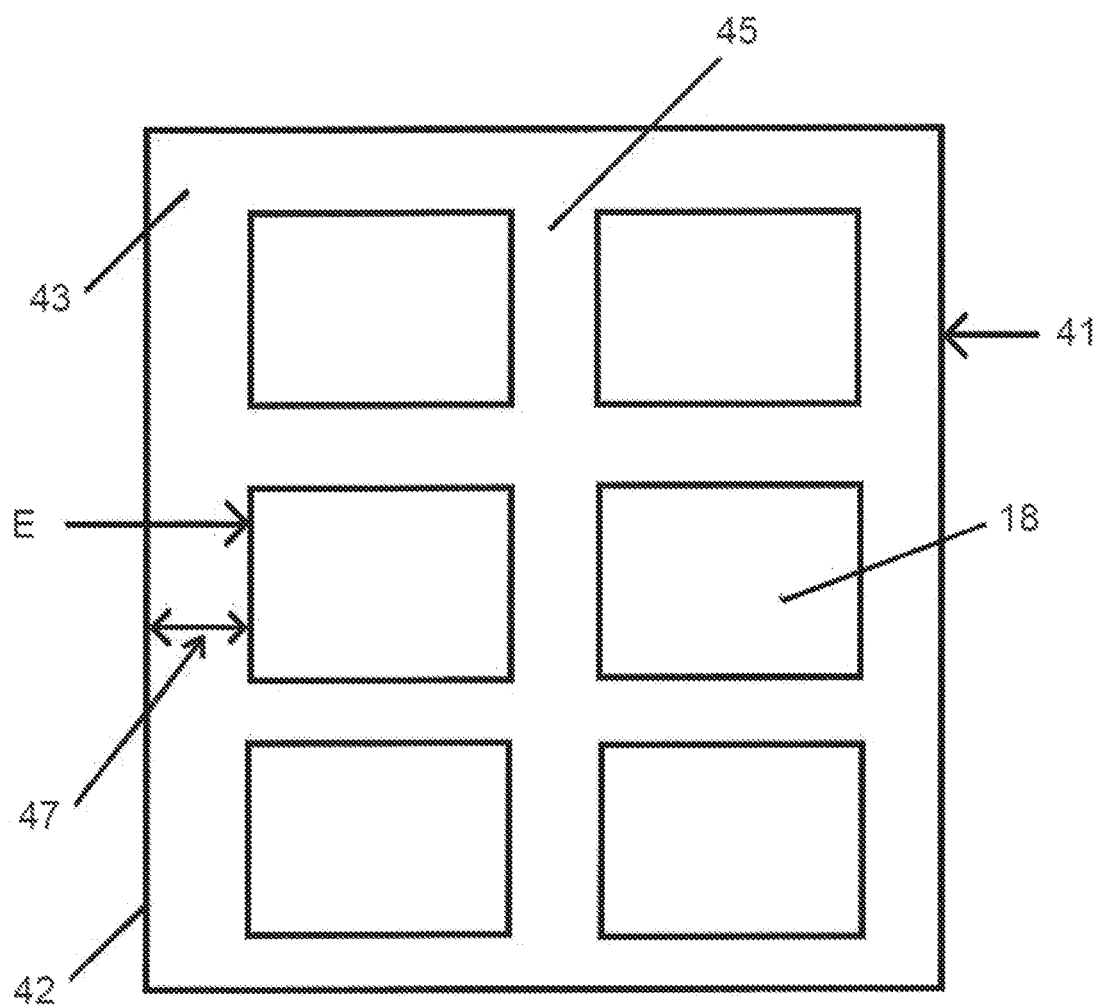
FIG. 4 is an overhead view of a pattern for placing fragile insulation materials according to embodiments of the present invention.

An exemplary process for forming the composite boards of the invention can be described with reference to FIG. 3, which shows system 30 including conveyor system 32. In a first step, a foam board 42 is placed on conveyor system 32. Following this step, fragile insulation materials 18 are deposited on or applied to foam board 42 within a second step. In one or more embodiments, fragile insulation materials 18 are adhesively mated or otherwise affixed to a top planar surface of foam board 42 (e.g. to a foam layer or a facer) through the use of an adhesive. Accordingly, the process may include the step of applying an adhesive to the fragile insulation material, to the foam board, or to both the fragile insulation material and the foam board. The adhesive may include, for example, hot melt adhesives, contact adhesives, or liquid adhesives. As generally shown in FIG. 3, and as more specifically shown in FIG. 4, fragile insulation materials 18, which may have a rectangular or square shape, are placed on an upper surface 43 of foam board 42 according to a desired pattern that provides interstices 45 between the respective fragile insulation materials 18. Additionally, fragile insulation materials 18 are placed upon upper surface 43 of foam board 42 in a manner that provides a gap 47 between the edge 41 of foam board 42 and the outer most edge E of fragile insulation materials 18.

In one or more embodiments, the fragile insulation materials 18 may be adhered to the foam board 42 in advance of the encapsulating procedures. For example, in one or more embodiments, the fragile insulation materials 18 may be adhered to a foam board 42 in a desired pattern prior to incorporation of the fragile insulation materials 18 into the procedures described herein. Thus, while the embodiments described above position the fragile insulation materials 18 onto the foam board 42 within a continuous, integrated process, other embodiments allow for the fragile insulation materials 18 to be positioned on the foam board 42 within an "off-line" step that is separate and distinct from the process of depositing the foam. Various adhesives may be employed including, but not limited to, hot melt adhesives, contact adhesives, and liquid adhesives.

In one or more embodiments, the fragile insulation materials 18 are arranged in a pattern to achieve relatively high coverage with respect to the planar surface of the finished composite 10. In one or more embodiments, the fragile insulation materials 18 are arranged in a pattern sufficient to cover at least 60%, in other embodiments at least 70%, in other embodiments at least 75%, and in other embodiments at least 80% of the surface area of the final foam composite 10, where the surface area is taken on a plane of the final product that passes through the insulating materials (i.e. generally through a plane than runs through the length and width of the board). In one or more embodiments, while increased coverage is desirable, the pattern may desirably provide for sufficient interstices between the respective fragile insulation materials 18. Also, the pattern may desirably provide for sufficient gaps between the outer most fragile insulation materials 18 and the edges of the composite board. These interstices and gaps will, once filled with the foam material, provide sufficient integrity to the composite including sufficient mechanical strength between the planar faces of the composite.

Following placement of the fragile insulation materials 18 on the upper surface 43 of foam board 42, developing foam 37 is deposited over the upper surface of fragile insulation materials 18, as well as within interstices 45 and gap(s) 47 exposed in the upper surface 43 of foam board 42.

As described above, developing foam 37 can be provided from an A-side stream of reactants and a B-side stream of reactants. Using conventional procedures, the developing foam can be deposited using one or more mix heads, not shown.

In one or more embodiments, sufficient developing foam is deposited over the upper surface of fragile insulation materials 18 to provide a layer of sufficient thickness to protect the fragile insulation materials 18. In one or more embodiments, this layer (i.e. the layer above the insulation devices) may be from about 0.25 inches (0.64 cm) to about 2 inches (5.08 cm), in other embodiments from about 0.375 inches (0.95 cm) to about 1 inch (2.54 cm), and in other embodiments from about 0.5 inches (1.27 cm) to about 0.75 inches (1.91 cm).

Following the step of depositing the foam, a facer material 22 may be applied to the developing foam. Following application of facer 22, the pre-cured composite can then be conveyed into a laminator 49, which sets the overall thickness of the finished composite and wherein at least partial curing of the foam takes place. For example, within laminator 49, heat may be applied from a heat source to facilitate the polyurethane and/or polyisocyanurate reaction and thereby cure the polyurethane and/or polyisocyanurate material in the formation of the cellular foam product. In one or more embodiments, the surface of the composite is heated to achieve a surface temperature of from about 140 to about 180° C.

As with conventional procedures for producing polyisocyanurate construction boards, once the polyisocyanurate material leaves the laminator, the foam product (which may be referred to as a composite) can be trimmed or otherwise finished, and cut to length. In practicing the present invention, the foam product can be cut to length and, in certain embodiments; the fragile insulation material will not be cut. In other words, in one or more embodiments, the foam product will be cut to length by cutting between the interstices that may be provided between the fragile insulation materials. Several techniques can be employed to determine the location of the interstices, which may not be readily apparent due to the fact that they are encapsulated. In one or more embodiments, x-ray or other analytical techniques can be employed to locate the interstices between the fragile insulation materials. In other embodiments, the fragile insulation materials can be modified with a place marker prior to being incorporated into the process. For example, a vertically extending marker can indicate one or more edges of the fragile insulation materials, and these markers can be later used to identify the interstices and thereby provide a location for cutting the foam product to length.

Figure 5:
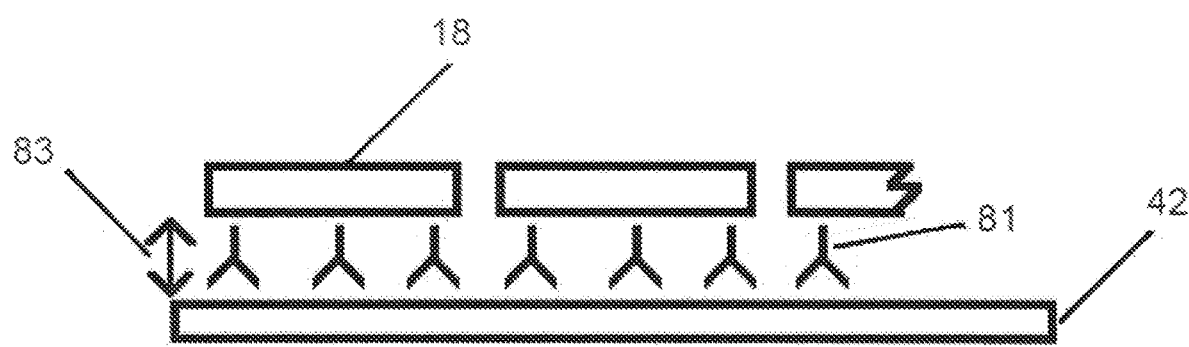
FIG. 5 is a cross-sectional, side view showing a step according to a process according to embodiments of the invention.

In one or more embodiments, prior to the step of placing fragile insulation materials onto foam board, the process may include a step of depositing one or more spacers onto the board. The spacer(s) provide a support upon which the fragile insulation materials may be positioned and thereby provide sufficient spacing between foam board and fragile insulation materials. For example, and with reference to FIG. 5, spacers 81 deposited on board 42 and provide a support for fragile insulation materials 18 so that a sufficient space 83 exists between foam board 42 and fragile insulation materials 18. In one or more embodiments, spacer 81 may be from about 0.25 inches (0.64 cm) to about 2 inches (5.08 cm), in other embodiments from about 0.375 inches (0.95 cm) to about 1 inch (2.54 cm), and in other embodiments from about 0.4 inches (1.02 cm) to about 0.75 inches (1.91 cm). The existence of sufficient space 83 will allow for developing foam to additionally be deposited beneath the fragile insulation materials 18.

Practice of one or more embodiments of the present invention is not necessarily limited by the shape of spacer(s) 81. For example, spacer(s) 81 may take on the form of a jack, which generally has six points or knobs projecting from a common base. Likewise, the material from which spacer(s) 81 is fabricated can vary. For example, in one or more embodiments, spacer(s) 81 may be fabricated from a plastic material or a thermosetting material. In one or more embodiments, spacers 81 may be adhesively secured to foam board 42. In other embodiments, spacers 81 may be adhesively secured to fragile insulation materials 18. In one or more embodiments, spacers 81 may be adhesively secured to both foam board 42 and fragile insulation materials 18.

In one or more embodiments, the spacer may include a fabric. These fabrics may have sufficient thickness to provide a desired gap between foam board 42 and the positioning of fragile insulation materials 18. This gap may be consistent with the dimensions provided above for spacers 81. While the fabric will have sufficient density, and therefore sufficient compressive strength, to maintain the fragile insulation materials sufficiently above foam board 42 to maintain the desired gap between foam board 42 and fragile insulation materials 18, the fabric is characterized by a density that allows for the adsorption of developing foam, and thereby allows the developing foam to fully encapsulate the fragile insulation materials. This step of applying the developing foam will be described in greater detail herein below.

In one or more embodiments, spacer(s) 81 may be pre-attached to foam board 12, in other embodiments pre-attached to the fragile insulation material 18, or in other embodiments to both the foam board 42 and the fragile insulation material 18 prior to incorporating these elements of the process of the present invention. For example, in one or more embodiments, spacer(s) 81 are pre-attached to the fragile insulation material 18 within an "off-line" step that is separate and distinct from the process of depositing the developing foam onto the fragile insulation material 18.

Developing Foam

In exemplary embodiments, the developing foam is a polyurethane and/or polyisocyanurate developing foam. As those skilled in the art appreciate, these foams are formed by mixing a first stream that includes an isocyanate-containing compound with a second stream that includes an isocyanate-reactive compound. Using conventional terminology, the first stream (i.e. the stream including an isocyanate-containing compound) may be referred to as an A-side stream, an A-side reactant stream, or simply an A stream. Likewise, the second stream (i.e. the stream including an isocyanate-reactive compound) may be referred to as a B-side stream, B-side reactant stream, or simply B stream. In any event, the reaction that ensues produces a foam that, according to one or more kinetic and/or thermodynamic properties, develops over a period of time.

In one or more embodiments, either stream may carry additional ingredients including, but not limited to, flame-retardants, surfactants, blowing agents, catalysts, emulsifiers/solubilizers, fillers, fungicides, anti-static substances, and mixtures of two or more thereof.

A-Side Stream

In one or more embodiments, the A-side stream may only contain the isocyanate-containing compound. In one or more embodiments, multiple isocyanate-containing compounds may be included in the A-side. In other embodiments, the A-side stream may also contain other constituents such as, but not limited to, flame-retardants, surfactants, blowing agents and other non-isocyanate-reactive components. In one or more embodiments, the complementary constituents added to the A-side are non-isocyanate reactive.

Suitable isocyanate-containing compounds useful for the manufacture of polyisocyanurate construction board are generally known in the art and embodiments of this invention are not limited by the selection of any particular isocyanate-containing compound. Useful isocyanate-containing compounds include polyisocyanates. Useful polyisocyanates include aromatic polyisocyanates such as diphenyl methane diisocyanate in the form of its 2,4'-, 2,2'-, and 4,4'-isomers and mixtures thereof. The mixtures of diphenyl methane diisocyanates (MDI) and oligomers thereof may be referred to as "crude" or polymeric MDI, and these polyisocyanates may have an isocyanate functionality of greater than 2. Other examples include toluene diisocyanate in the form of its 2,4' and 2,6'-isomers and mixtures thereof, 1,5-naphthalene diisocyanate, and 1,4' diisocyanatobenzene. Exemplary polyisocyanate compounds include polymeric Rubinate 1850 (Huntsmen Polyurethanes), polymeric Lupranate M70R (BASF), and polymeric Mondur 489N (Bayer).

B-Side Stream

In one or more embodiments, the B-side stream may only include the isocyanate-reactive compound. In one or more embodiments, multiple isocyanate-reactive compounds may be included in the B-side. In other embodiments, the B-side stream may also contain other constituents such as, but not limited to, flame-retardants, surfactants, blowing agents and other non-isocyanate-containing components. In particular embodiments, the B-side includes an isocyanate reactive compound and a blowing agent. In these or other embodiments, the B-side may also include flame retardants, catalysts, emulsifiers/solubilizers, surfactants, fillers, fungicides, anti-static substances, water and other ingredients that are conventional in the art.

An exemplary isocyanate-reactive compound is a polyol. The term polyol, or polyol compound, includes diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one or more embodiments, a polyester polyol is employed. In one or more embodiments, the present invention may be practiced in the appreciable absence of any polyether polyol. In certain embodiments, the ingredients are devoid of polyether polyols.

Catalysts

Catalysts, which are believed to initiate the polymerization reaction between the isocyanate and the polyol, as well as a trimerization reaction between free isocyanate groups when polyisocyanurate foam is desired, may be employed. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris[(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, Emulsifiers and Solubilizers

Surfactants, emulsifiers, and/or solubilizers may also be employed in the production of polyurethane and polyisocyanurate foams in order to increase the compatibility of the blowing agents with the isocyanate and polyol components. Surfactants may serve two purposes. First, they may help to emulsify/solubilize all the components so that they react completely. Second, they may promote cell nucleation and cell stabilization.

Exemplary surfactants include silicone co-polymers or organic polymers bonded to a silicone polymer. Although surfactants can serve both functions, it may also be useful to ensure emulsification/solubilization by using enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant B8522, and GE 6912. U.S. Pat. Nos. 5,686,499 and 5,837,742 are incorporated herein by reference to show various useful surfactants. Suitable emulsifiers/solubilizers include DABCO Ketene 20AS (Air Products), and Tergitol NP-9 (nonylphenol+9 moles ethylene oxide).

Flame Retardants

Flame Retardants may be used in the production of polyurethane and polyisocyanurate foams. Useful flame retardants include tri(monochloropropyl) phosphate (a.k.a. tris(cloro-propyl) phosphate), tri-2-chloroethyl phosphate (a.k.a tris(chloro-ethyl) phosphate), phosphonic acid, methyl ester, dimethyl ester, and diethyl ester. U.S. Pat. No. 5,182,309 is incorporated herein by reference to show useful blowing agents.

Blowing Agents

According to aspects of the present invention, second foam region 20 is substantially devoid of hydrocarbon blowing agents. Substantially devoid refers to that amount or less that does not have an appreciable impact on the construction boards of the present invention, particularly as the impact relates to the flammability of the construction boards. In one or more embodiments, second foam region 20 include carbon dioxide, air, or a vacuum or partial vacuum. As those skilled in the art appreciate, the presence of carbon dioxide can result from the use of water as a blowing agent during the manufacture of second foam region 20. In one or more embodiments, second foam region 20 include less than 2, in other embodiments less than 0.5, and in other embodiments less than 0.1 percent by volume hydrocarbon blowing agents. In particular embodiments, closed cells 26 are devoid of halogenated organic compounds.

Amount of Reactants

An isocyanurate is a trimeric reaction product of three isocyanates forming a six-membered ring. The ratio of the equivalence of NCO groups (provided by the isocyanate-containing compound or A-side) to isocyanate-reactive groups (provided by the isocyanate-containing compound or B side) may be referred to as the index or ISO index. When the NCO equivalence to the isocyanate-reactive group equivalence is equal, then the index is 1.00, which is referred to as an index of 100, and the mixture is said to be stoichiometrically equal. As the ratio of NCO equivalence to isocyanate-reactive groups equivalence increases, the index increases. Above an index of about 150, the material is generally known as a polyisocyanurate foam, even though there are still many polyurethane linkages that may not be trimerized. When the index is below about 150, the foam is generally known as a polyurethane foam even though there may be some isocyanurate linkages. For purposes of this specification, reference to polyisocyanurate and polyurethane will be used interchangeably unless a specific ISO index is referenced.

In one or more embodiments, the concentration of the isocyanate-containing compound to the isocyanate-reactive compounds within the respective A-side and B-side streams is adjusted to provide the foam product with an ISO Index, as determined by PIR/PUR ratio as determined by IR spectroscopy using standard foams of known index (note that ratio of 3 PIR/PUR provides an ISO Index of 300) of at least 180, in other embodiments at least 200, in other embodiments at least 220, in other embodiments at least 270, in other embodiments at least 285, in other embodiments at least 300, in other embodiments at least 315, and in other embodiments at least 325. In these or other embodiments, the ISO Index may be less than 360, in other embodiments less than 350, in other embodiments less than 340, and in other embodiments less than 335.

In one or more embodiments, the amount of surfactant (e.g. silicone copolymer) used in the manufacture of polyisocyanurate foam construction board according to the present invention may be described with reference to the amount of isocyanate-reactive compound employed (e.g. polyol). For example, in one or more embodiments, at least 1.0, in other embodiments at least 1.5, and in other embodiments at least 2.0 parts by weight surfactant per 100 parts by weight of polyol may be used. In these or other embodiments, at most 5.0, in other embodiments at most 4.0, and in other embodiments at most 3.0 parts by weight surfactant per 100 parts by weight of polyol may be used. In one or more embodiments, from about 1.0 to about 5.0, in other embodiments from about 1.5 to about 4.0, and in other embodiments from about 2.0 to about 3.0 of surfactant per 100 parts by weight of polyol may be used.

In one or more embodiments, the amount of flame retardant (e.g. liquid phosphates) used in the manufacture of polyisocyanurate foam construction board according to the present invention may be described with reference to the amount of isocyanate-reactive compound employed (e.g. polyol). For example, in one or more embodiments, at least 5, in other embodiments at least 10, and in other embodiments at least 12 parts by weight flame retardant per 100 parts by weight of polyol may be used. In these or other embodiments, at most 30, in other embodiments at most 25, and in other embodiments at most 20 parts by weight flame retardant per 100 parts by weight of polyol may be used. In one or more embodiments, from about 5 to about 30, in other embodiments from about 10 to about 25, and in other embodiments from about 12 to about 20 of flame retardant per 100 parts by weight of polyol may be used.

In one or more embodiments, the amount of catalyst(s) employed in practice of the present invention can be readily determined by the skilled person without undue experimentation or calculation. Indeed, the skilled person is aware of the various process parameters that will impact the amount of desired catalyst. Also, the amount of catalyst employed can be varied to achieve various desired properties such as the desired index.

Industrial Applicability

Roofing

In one or more embodiments, the construction boards of this invention may be employed in roofing or wall applications. In particular embodiments, the construction boards are used in flat or low-slope roofing system.

Figure 6:
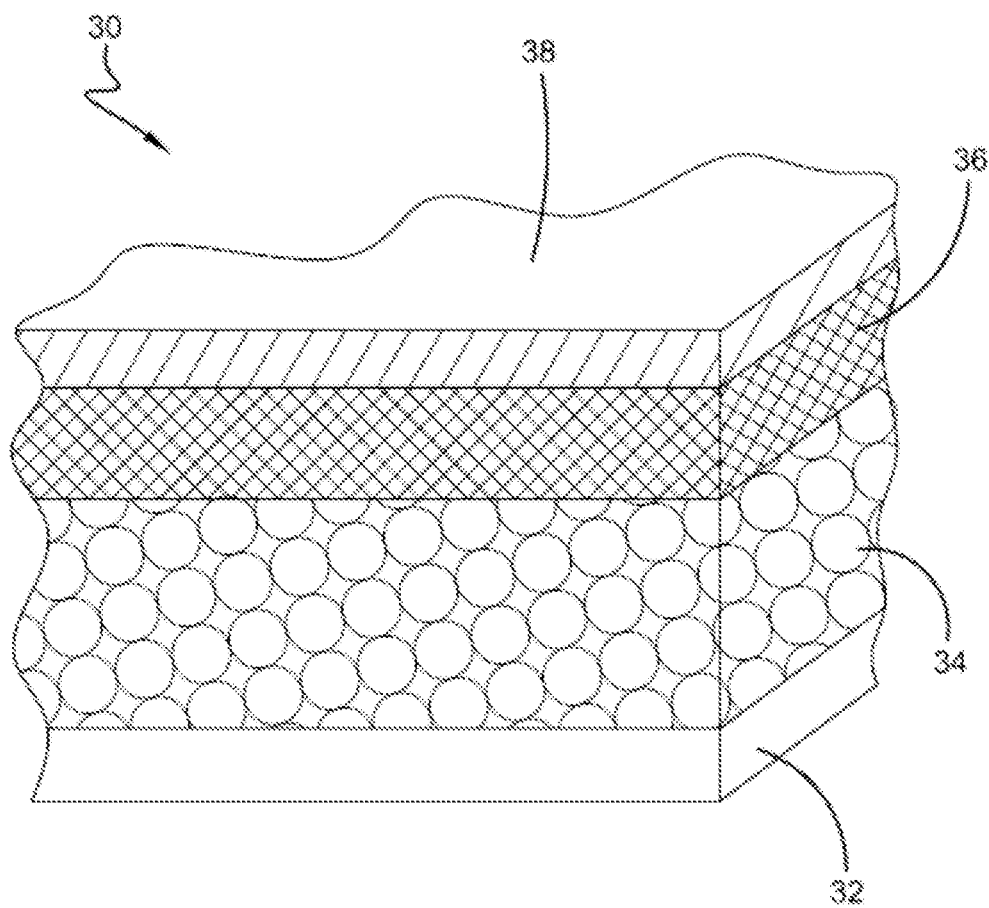
FIG. 6 is a cross-sectional, perspective view of a roofing system according to embodiments of the present invention.

In one or more embodiments, a roofing system 30 may be described with reference to FIG. 6, which shows a roof deck 32 having an insulation board 34, which may be fabricated according to practice of this invention, disposed thereon. An optional high density board 36 may be positioned above insulation board 34 relative to roof deck 32. Advantageously, use of the construction boards of the present invention may obviate the need for a separate high-density board since first foam region 12 can be manufactured to have a high-density, and the construction boards of the present invention, when included as insulation board 34 of roof system 30 can positioned so that first foam region 12 is positioned on top (i.e., further away from deck 32 relative to second foam region 16). A water-protective layer or membrane 38 is disposed on top or above high density board 36. In alternate embodiments, high density board 36 may be positioned below insulation board 34.

Practice of this invention is not limited by the selection of any particular roof deck. Accordingly, the roofing systems of this invention can include a variety of roof decks. Exemplary roof decks include concrete pads, steel decks, wood beams, and foamed concrete decks.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700, 538, 5,703,154, 5,804,661, 5,854,327, 5,093,206, and 5,468, 550, which are incorporated herein by reference. Other useful polymeric membranes include those made from various thermoplastic polymers or polymer composites. For example, thermoplastic olefin (i.e. TPO), thermoplastic vulcanizate (i.e. TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Still in other embodiments, the protective membrane can include bituminous or asphalt membranes. In one embodiment, these asphalt membranes derive from asphalt sheeting that is applied to the roof. These asphalt roofing membranes are known in the art as described in U.S. Pat. Nos. 6,579, 921, 6,110,846, and 6,764,733, which are incorporated herein by reference. In other embodiments, the protective membrane can derive from the application of hot asphalt to the roof.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The construction boards of this invention can be secured to a building structure by using various known techniques. For example, in one or more embodiments, the construction boards can be mechanically fastened to the building structure (e.g., the roof deck). In other embodiments, the construction boards can be adhesively secured to the building structure.

Building Envelope

In other aspects of the invention, the construction boards can be employed with a wall system. In one or more embodiments, the construction boards can be secured to a wall system exterior to the structural support, and in other embodiments the construction board can be secured to a wall system interior to the structural supports.

Figure 7:
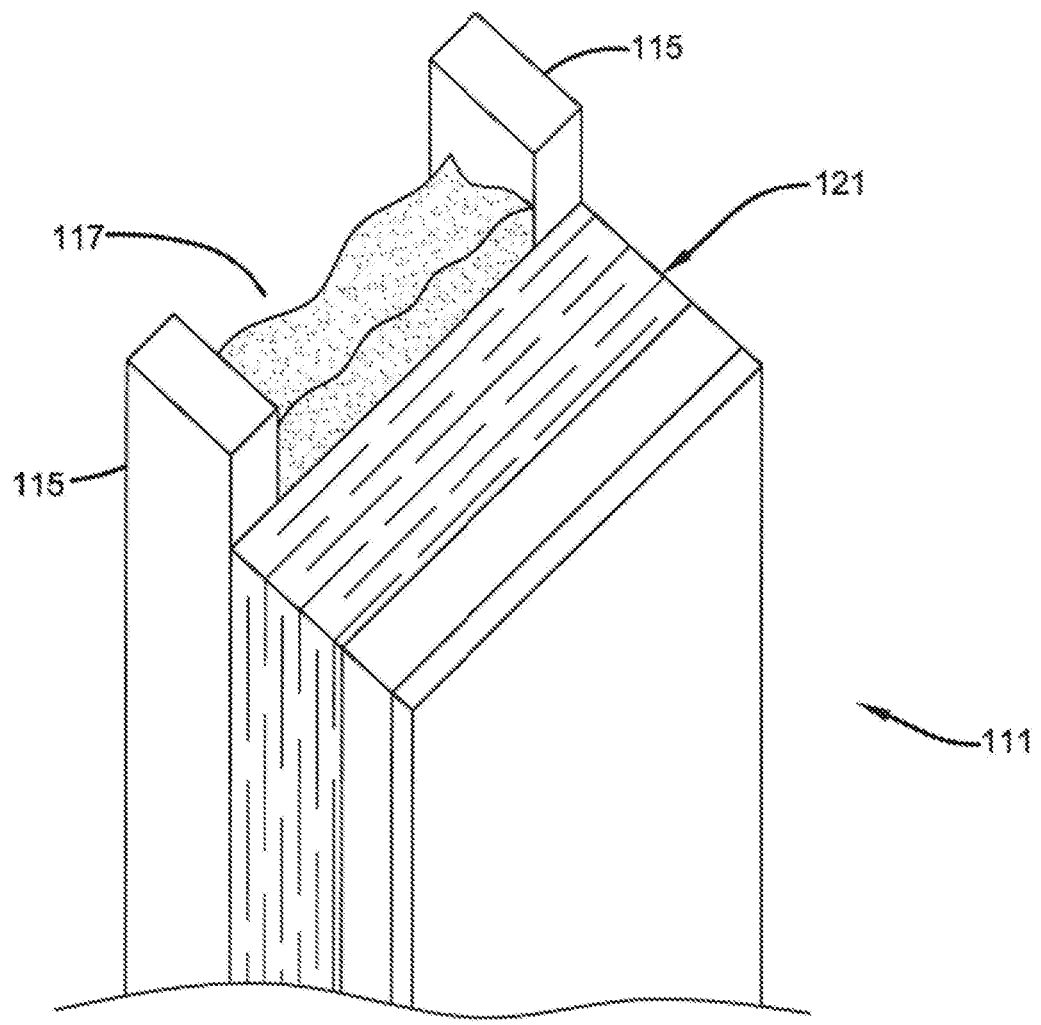
FIG. 7 is a cross-sectional, perspective view of a wall system according to embodiments of the invention.

For example, and as generally shown in FIG. 7, wall system 111 may include a support structure 113 including a plurality of support members 115. Support members 115 are typically positioned to provide interstices 117, which may also be referred to as cavities 117, between two or more support members 115. Composite board 121 is attached to one or more support members 115. As the skilled person will appreciate, composite board 121 can be attached to support members 15 through a variety of fastening systems including, but not limited to, adhesive systems and mechanical fasteners. In one or more embodiments, an interior or exterior sheathing 151, as the case may be, may be attached to one or more support members 115 opposite composite board 121. An exterior sheathing 61 may be attached to composite board 21 opposite support members 115.

Embodiments of the invention are not necessarily limited by the type of support structure employed within the wall systems of the present invention. For example, the support structure may include wood, composite, or steel studs.

Various modifications and alterations that do not depart from the scope and spirit of this invention will become apparent to those skilled in the art. This invention is not to be duly limited to the illustrative embodiments set forth herein.

What is claimed is:

1. A composite board comprising:
   (i) a subassembly including a first foam region sandwiched between opposed first and second facers where the first foam region comprises a polyisocyanurate rigid, closed-cell foam body, where said polyisocyanurate foam body is characterized by a density of greater than 2.5 pounds per cubic foot, where the first foam region includes at least 5000 ppm of a physical blowing agent based on the weight of the first foam region;
   (ii) a plurality of fragile insulating materials disposed on said first facer of said subassembly; and
   (iii) a second foam region including a water-blown polyisocyanurate or polyurethane rigid, closed-cell foam, where said second foam region is characterized by a density of less than 2.5 pounds per cubic foot, and where said second foam region includes less than 1000 ppm of the physical blowing agent based on the weight of the second foam region, where said second foam region at least partially encases said plurality of fragile insulating materials and at least partially contacts said first facer of said subassembly.

2. The composite board of claim 1, where said second foam region is devoid of the physical blowing agent.

3. The composite board of claim 1, where the second foam region includes a flame retardant.

4. The composite board of claim 3, where the flame retardant is a phosphorus-containing compound.

5. The composite board of claim 4, where the flame retardant is a phosphate.

6. The composite of claim 1, further comprising an external facer disposed on a surface of said second foam region opposite said first facer of said subassembly.

7. The composite of claim 6, where at least one of said second facer of said subassembly and said external facer includes a glass substrate.

8. The composite of claim 7, where at least one of said second facer of said subassembly and said external facer includes first and second coating layers on said glass substrate, where said first coating layer forms an external surface of the composite, where said first coating layer includes an inert filler and a binder.

9. The composite of claim 8, where said second coating includes an intumescent material and a binder.

* * * * *